United States Patent [19]

Ricard

[11] 4,409,685
[45] Oct. 11, 1983

[54] METHODS AND TAXIMETERS FOR CALCULATING A TAXI FARE

[76] Inventor: Claude F. Ricard, 10 Oliveraie G - Route de Nice, Aix-en-Provence, France, 13100

[21] Appl. No.: 228,741

[22] Filed: Jan. 27, 1981

[30] Foreign Application Priority Data

Feb. 7, 1980 [FR] France ................ 80 02900

[51] Int. Cl.³ .................... G07B 13/00; G06F 15/20
[52] U.S. Cl. ............................. 377/20; 235/30 R; 364/467
[58] Field of Search .......... 235/92 TC, 30 R, 92 DM, 235/92 DN, 92 R; 364/467

[56] References Cited

U.S. PATENT DOCUMENTS

| | | | |
|---|---|---|---|
| 3,512,706 | 5/1970 | Sanders | 235/30 R |
| 3,818,186 | 6/1974 | Harwood | 235/30 R |
| 3,880,350 | 4/1975 | Iwatani et al. | 235/92 DN |
| 3,970,827 | 7/1976 | Ikuta et al. | 235/92 TC |
| 4,045,656 | 8/1977 | Scott | 235/92 TC |
| 4,118,775 | 10/1978 | Boyce | 364/467 |
| 4,160,155 | 7/1979 | Steele et al. | 235/92 TC |

FOREIGN PATENT DOCUMENTS

| | | |
|---|---|---|
| 1514687 | 3/1967 | France . |
| 2104061 | 4/1972 | France . |
| 1240325 | 7/1968 | United Kingdom . |
| 1388158 | 3/1975 | United Kingdom . |
| 1519721 | 8/1978 | United Kingdom . |

*Primary Examiner*—Howard Britton
*Attorney, Agent, or Firm*—Brumbaugh, Graves, Donohue & Raymond

[57] ABSTRACT

Electronic taximeter comprising a clock, a distance pick-up, a counter registering the number n1 of clock pulses delivered between two distance pulses, three registers R2, R3, R4 in which are recorded constant numbers n2, p2 and p1, a multiplier circuit, a selector circuit, a totalizing counter and a luminous display unit.

Each taxi run is split into successive portions of equal length, and the fixed unit price p2 and the price n1.p1 variable with the speed are worked out for each portion, after what the highest of the two is selected and a total fare is displayed by adding up the partial prices.

6 Claims, 4 Drawing Figures

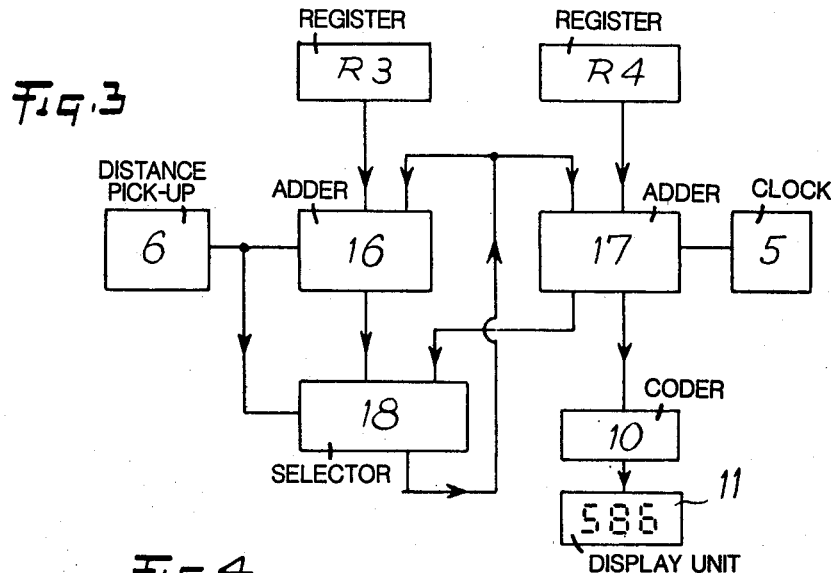
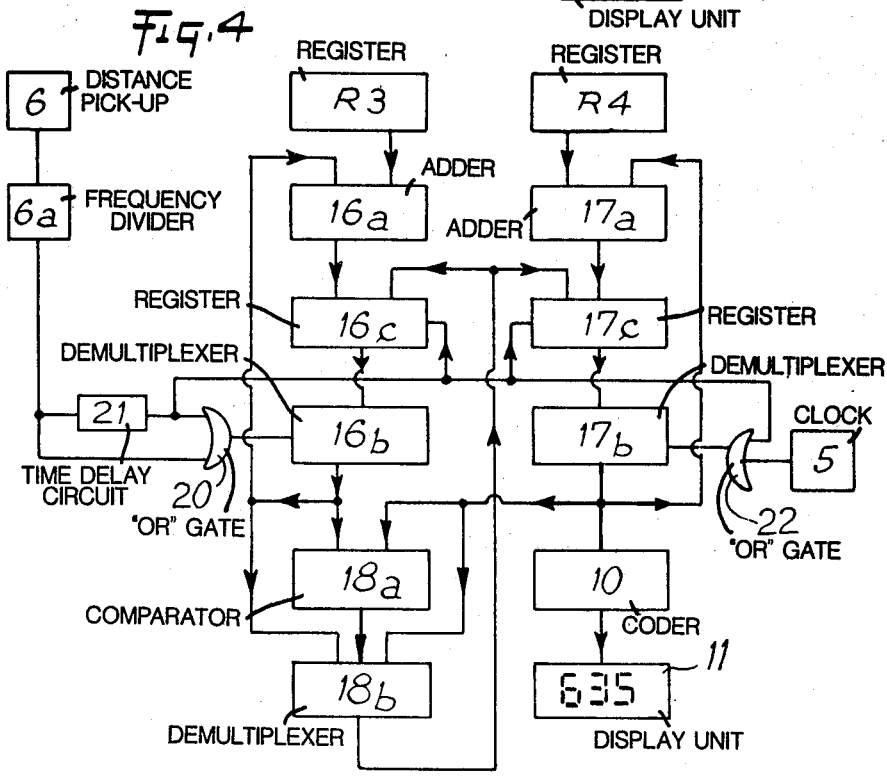

METHODS AND TAXIMETERS FOR CALCULATING A TAXI FARE

The present invention relates to methods and to taximeters for calculating a taxi fare.

The technical sector of the invention is that of construction of electronic taximeters.

It should first be recalled that the taxi fare which is displayed by a taximeter is obtained by continually comparing the rate per kilometer with a rate per hour and by applying every time the highest of the two.

With the known mechanical taximeters, this selection is done automatically by comparing the speed of rotation of two pinions which rotate, one at a constant speed and the other proportionally to the speed of the vehicle, and it is the pinion rotating the fastest which drives the price counter.

The known electronic taximeters comprise, on the one hand, a clock delivering pulses of constant frequency and, on the other hand, means for picking up the distance travelled which deliver pulses in a number proportional to the distance travelled by the vehicle.

Electronic taximeters comprise a calculation unit which works out a taxi fare by adding up partial prices which correspond to successive elementary portions whose length or duration can be equal or not. For each portion of a taxi run, the calculating unit sets up the partial fare by multiplying either the distance travelled by the set price of the unit of distance, or the time spent by the set price of the unit time.

The electronic taximeters comprise a logic unit of selection which decides for each elementary portion of taxi run whether the calculating unit should take into account either the distance covered or the time spent. Said logic unit is an essential part of an electronic taximeter and the accuracy of the fare calculation is largely dependent on the criteria of selection used in the said logic unit of selection.

There is a vehicle moving speed, called conjunction speed, which is that for which the price of a portion of taxi run is the same whether the rate per kilometer or the rate per hour is applied.

Various methods and devices have been proposed to calculate electronically the partial fares with an accuracy of the order of ±1% on the total fare, which is the required accuracy.

French Pat. No. 1 514 687 (KIENZLE) describes a comparison device, called overload circuit, which comprises a flip-flop, receiving at each one of its two input terminals the pulses issued respectively from a pick-up of distance travelled and from a clock.

Said flip-flop is associated to a logic gate and to two diodes and lets through those pulses whose frequency is the highest.

The functioning of this device is based on a distance pick-up and on a clock, both delivering pulses of similar frequency when the taxi travels at a speed which is equal to the conjunction speed. But the frequency of the distance pick-up is linked to the number of revolutions effected by the vehicle wheels in one second, and this frequency is low, of the order of only a few hertz, so that such a device lacks precision.

British Pat. No. 1 240 325 (J. F. Bruce SANDERS) as well as U.S. Pat. No. 3,512,706 corresponding thereto, describe an electronic taximeter which comprises both an oscillator and a distance pick-up sending for example two pulses per revolution of the driving shaft. The device comprises means permitting to stop the counting of the waiting time as soon as the taxi starts moving. When the handle of the taximeter is placed in the "hired" position, the pulses of distance travelled reset constantly a divider placed next to the clock and no waiting time is billed.

According to a variant, the taximeter comprises an oscillator whose frequency corresponds to that of the distance pick-up when the taxis travels at the minimum speed or conjunction speed.

A logic device comprising two flip-flops and gates allows the distance pulses through the counting unit if their frequency is higher than that of the clock pulses.

This device, like the previous one, necessitates the use of a clock whose frequency is equal to the frequency of the distance pulses wen the taxi travels at the conjunction speed, this limiting to a larger extent the accuracy of these devices.

U.S. Pat. No. 4,118,775 (P. H. BOYCE) describes another device which is composed of two storage registers of the RAM type. In one of these registers R1, is recorded a constant number of pulses corresponding to the number of distance pulses which would be delivered by the distance pick-up for a very specific period, for example one second, if the taxi were travelling at the conjunction speed. In a second register R2 are recorded the distance pulses delivered by a distance pick-up. Every second, the contents of R2 are transferred to a calculating unit WR and compared with the number recorded in R1. If R2 is higher than R1, R2 is chosen. In the event of the contrary, R1 is chosen.

There is a risk with this type of device of serious errors being made when the taxi travels at a speed close to the conjunction speed.

Indeed, the distance pick-up currently used are revolution pick-ups which are associated to the tachometric cable actuating the vehicle mileometer and speedometer, which latter is connected to the output shaft of the gear-box.

The number of revolutions of a tachometric cable per kilometer travelled by the vehicle is generally between 700 and 1200, i.e. each revolution corresponds to a travelled distance which is situated between 0.80 m and 1.50 m approximately.

Taking a normal practical instance wherein the conjunction speed is 7.2 Km/hour, wherein the distance pick-up delivers two pulses per cable revolution and wherein the tachometric cable effects 1000 revs. per kilometer travelled, i.e. one rev per meter travelled, we see that we obtain four pulses per second at the conjunction speed. When the taxi moves at around that speed, the number of distance pulses sent every second will then have to be compared with the number four. It is therefore obvious that the position of the first distance pulse with respect to the beginning of each comparison period can vary by a period which is equal to a quarter of the comparison period and for the same travelling speed of the taxi, the number of distance pulses counted per second can therefore vary between three and five, hence a cause for serious error in the fare which greatly exceeds the accepted tolerances.

In order to overcome this disadvantage, it would be possible to increase the duration of the comparison periods so as to compare larger numbers of distance pulses per period. But then another cause for error is introduced in that, during one and the same period, the instantaneous speed of the taxi can depart from the average speed. Theoretically, it would be possible to increase the frequency of the distance pulses, but one is rapidly restricted when taking this course, by the technological limitations related to the constructions of distance pick-ups which will not be either too cumbersome or too expensive, and it is an accepted fact that in practice, the pick-ups of distance travelled deliver at the maximum three pulses per meter travelled, i.e. six pulses per second at the conjunction speed, whereas it is currently known to build for a very low price, electronic clocks which oscillate at the frequency of 1 KHz.

Taximeters exist which calculate a predetermined number of pulses corresponding to a specific sum and which increment the displayed fare every time the counted number of pulses reaches the predetermined number.

U.S. Pat. No. 3,970,827 (H. IKUTA et al.) describes a taximeter of this type which comprises a speed detection circuit which detects when the speed of the vehicle is less or greater than a reference speed equal to the conjunction speed and which controls a selection circuit letting through either the clock pulses or the pulses delivered by the distance pick-up.

A counter adds up the pulses traversing the selector.

When the number of pulses recorded by the said counter reaches a predetermined value, the counter actuates a pulse generator delivering a predetermined number of pulses which increase the displayed price by a constant quantity or basic portion.

This particular mode of display of the fares by successive basic portions give rise to errors in the fares which it is the object of the present invention to eliminate.

The object of the present invention is to propose electronic means based on a new method of splitting a taxi run in very short successive elementary portions, and permitting, when the taxi travels at a speed approaching the conjunction speed, to select with great accuracy, the portions of run which should be billed in relation to the distance travelled and those which should be billed according to the rate per hour.

The methods according to the invention for calculating a taxi fare displayed on a taximeter comprise known operations according to which the distance travelled by the taxi is measured by means of a distance pick-up which delivers a number of pulses proportional to said distance and the duration of the taxi run is measured by means of an electronic clock which delivers pulses of constant and high frequency.

The object of the invention is reached with methods which consist in the following operations:
  the taxi run is split into successive elementary portions of equal length, which is the constant distance travelled by the taxi between two successive pulses sent by the distance pick-up or by a frequency divider connected therewith;
  the number of pulses $n1$ delivered by the said clock during each elementary portion, i.e. between two successive pulses delivered by the distance pick-up or by the frequency divider, is counted;
  after each portion a constant number $p2$ which is the unit fare for a distance equal to the constant length of each portion is compared with a variable number $n1.p1$ which is the partial price of the portion obtained by multiplying the price $p1$ of a unit time equal to the period of the said clock by the duration of each portion $n1$;
  the highest of these two numbers is selected as partial price of the said elementary portion;
  and the total fare is calculated by adding up the said partial prices.

According to a first method:
  a constant number $n2$ which is equal to the number of pulses delivered by the said clock for the period necessary to travel one portion at the conjunction speed, is recorded in a register;
  after each elementary portion, the variable number of pulses $n1$ is compared with the number $n2$;
  and depending on whether $n1$ is greater or smaller than $n2$, either the price $n1.p1$ or the price $p2$ is selected as partial price of the elementary portion.

According to a preferred variant:
  to a first adder circuit are connected, first a register R3 in which is recorded the unit price $p2$ and second, the said pick-up and the contents of the said adder is increased by a value equal to $p2$ every time the pick-up delivers a pulse;
  to a second adder circuit are connected, first a register R4 in which is recorded the unit price $p1$ and second the said clock, and the contents of the second adder are increased by a value equal to $p1$ every time the clock delivers a pulse;
  the outputs of the said adders are connected to a selective switching circuit comprising a comparator comparing the numbers recorded in the two counters and a demultiplexer which routes towards the output terminal the highest of the two;
  the output of the said switching circuit is reconnected in parallel on the said adder circuits, so that after each pulse delivered by the said pick-up, the highest of the two figures recorded in the said adder circuits comes to be recorded in the two adder circuits;
  and the output of the clock pulse counter is connected to a luminous display device.

A taximeter according to the invention is of the known type comprising a distance pick-up which delivers a number of pulses proportional to the distance travelled by the taxi, an electronic clock, means for dividing each taxi run into successive elementary portions and for calculating a partial price of each portion, a totalizing counter totalling the said partial prices and a luminous display means for displaying the price recorded in the said accumulating counter.

A taximeter according to the invention comprises:
  a register R3 in which is recorded a constant number equal to the unit price $p2$ of a distance equal to the constant distance travelled by the taxi between two pulses delivered by the said distance pick-up;
  a register R4 in which is recorded a number equal to the unit price $p1$ of a hired duration equal to the period of the said clock;
  a pulse counter counting the number of pulses $n1$ delivered by the said clock between two pulses delivered by the said pick-up;
  and logic circuits which compare after each pulse delivered by the said pick-up the number $p2$ with the product $n1.p1$ and select as partial price of the said portion the highest of the two numbers.

According to a first embodiment, a taximeter according to the invention comprises:
  a register R1 which is connected to the output terminals of the said pulse counter;
  a second register R2 in which is recorded a constant number $n2$ equal to the number of pulses delivered by the said clock during the period separating two pulses delivered by the said counter when the taxi travels at the conjunction speed;

a multiplier circuit to which are connected the register R4 and the register R1 and which calculates the product n1.p1;

a comparator comparing the numbers n1 and n2 recorded in the registers R1 and R2;

and a demultiplexer circuit with two inputs, connected respectively to the register R3 and the multiplier circuit, which demultiplexer circuit is controlled by the logic signal delivered by the said comparator, so that it transmits the product n1.p1 if n1 is higher than n2 and that it transmits the price p2 recorded in the register R3 if n1 is smaller than n2 and the output terminal of the said demultiplexer circuit is connected to an accumulating counter.

According to another preferential embodiment, a taximeter according to the invention comprises:

a first adder circuit on which are connected the said distance pick-up and the said register R3, which first pick-up is of the type whose contents are increased by an amount equal to p2 every time it receives a pulse from the pick-up;

a second adder circuit on which are connected the said clock and the register R4, said second adder being of the type whose contents are increased by an amount equal to p1 every time it receives a clock pulse;

a selecting logic circuit comprising two input terminals connected to the input terminals of the two adders and a control terminal connected to the output terminal of the distance pick-up, which selecting circuit is of the type which compares the numbers recorded in the adders every time it received a pulse from the pick-up and which lets through the highest of the two numbers and the output terminal of the selecting circuit is reconnected in parallel on the two adders, so that after each pulse delivered by the pick-up, the same number equal to the number P is found in the two adders which was there after the preceding pulse, increased by the higher of the two numbers p2 and n1.p1 recorded respectively in the two adders between two pulses of the pick-up, the number n1 being the number of clock pulses delivered between two pulses of the distance pick-up and the second adder is used as a price accumulating counter and is connected on the luminous display means of the taximeter.

The invention results in new electronic taximeters equipped with a logic unit which splits each taxi run into successive elementary portions, of equal length, whereas the known taximeters work by successive portions of equal duration. This modification in the splitting of the taxi run entails a simplification of the circuits and a more accurate selection of the partial prices when the taxi travels at an average speed approaching the conjunction speed.

Indeed, this splitting up into portions of equal length means that the comparisons are made on the duration of each portion of taxi run, which durations are measured by numbers of electronic clock pulses. And it is commonly known to produce electronic clocks whose frequency is high, for example of the order of KHz or more.

The selection effected by the logic circuits according to the invention is dependent on a comparison between two high numbers of clock pulses, for example, numbers reaching several hundreds, and the accuracy of decision which is of the order of one to two clock pulses is therefore very great. Moreover, the splitting into portions of equal length permits to divide the taxi run into very short elementary portions of the order of a fraction of a meter, which are infinitesimal portions with respect to the total length of the run.

The method of splitting the taxi run into portions of equal length permits the division of the run into a much higher number of portions than the method wherein the taxi run is split into portions of constant period, in that part of the run which is travelled at a higher speed than the conjunction speed which is generally the most expensive part of a taxi run and therefore it permits to improve the overall accuracy of the calculation of the total fare.

The description refers to embodiments with discrete components (non-integrated) but the methods according to the invention can easily be performed with integrated circuits of the microprocessor type comprising memories in which are stored the successive operations of splitting into portions and comparing the partial prices.

The invention will be more readily understood on reading the following description with reference to the accompanying drawings in which:

FIG. 3 is a diagram of a preferential variant of the aforesaid logic unit.

FIG. 4 is a diagram of an embodiment of the circuits of FIG. 3.

FIG. 1 shows very diagrammatically the essential members of an electronic taximeter of the type comprising a microprocessor composed of a central processing unit 1 and of memories 2, 3 etc . . . produced in the form of large scale integrated circuits (LSI circuits).

Figure 1:
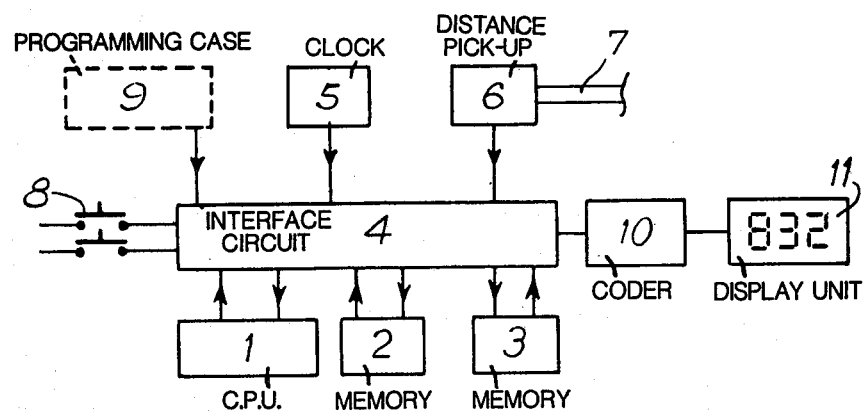
FIG. 1 is a block diagram showing the essential parts of an electronic taximeter and their inter-connections.

The memories 2, 3 etc . . . comprise read only memories (ROM) and random access memories (RAM).

The ROM memories contain the permanent data necessary to the operation of the taximeter, and in particular the instruction setting out the working programme of the central processor 1.

The RAM memories contain the temporal data, such as for example the cost of the time unit and of the distance unit depending on the rates used and on local regulations.

The calculating unit 1 and the memories communicate together and with data input and output members via an interface circuit 4.

The data input member comprises an electronic clock 5 and a pick-up 6 which is connected to a tachometric cable 7 which is plugged into the output shaft of the speed-box and turns at the same speed as said shaft. The pick-up 6 delivers pulses in number proportional to the number of rotations of the output shaft of the speed-box and therefore to the distance travelled by the taxi. The input members also comprise switches or pushbuttons 8 which are on the housing of the taximeter and permit for example to indicate the exact moment when a taxi is hired by a client and what rate should be applied according to local regulations which set down several types of rates, such as day rate, night rate, town rate, out-of-town rate, etc . . . .

A special input member 9 has been shown in dotted line and does not form part of the taximeter. Said reference 9 illustrates a programming case which is at the disposal of the Office of the Inspector of Weights and Measures or any other official services whose duty it is to control that the taximeters are in good working order.

The programming case is connected by way of a multi-conductor cable to a socket provided on the taximeter and it permits to modify the unit prices recorded in a RAM type memory whenever the current official regulations make it necessary.

The output members comprise a coding circuit 10 and a luminous display unit 11 on which the face is displayed throughout the whole length of the taxi run.

FIG. 1 is a simplified description of an electronic taximeter of the known type. This type of taximeter being already known it is deemed unnecessary to give a more detailed description of it. The said description has been limited to the essential members which are evoked in the rest of the present description.

It must be recalled that the main difficulty to overcome in an electronic taximeter is the splitting of a taxi run into successive elementary portions of run and to decide, for each elementary portion, whether it should be priced on the basis of the distance or on the duration of the portion.

When the taxi travels at a speed approaching the conjunction speed, this decision becomes difficult to take and its precision constitutes an essential condition to the good accuracy of the taximeter.

A taximeter being an instrument designed to work out a public price, it becomes absolutely essential that this price should be established with great accuracy and based on reliable criteria.

The choice between a rate per kilometer of an hourly rate to be applied to each elementary portion of run is obviously dependent of the type of splitting into portions which has been selected, and it will be all the more accurate that the successive portions are many and short.

In order to give an idea, let us take a numerical example which is not restrictive in any way, but is designed to give an order of magnitude. Supposing that the clock 5 issues pulses whose frequency is 1 KHz. Supposing that the basic hourly rate is FF. 36 per hour, i.e. 1 centime per second and 0.001 centime per clock pulse. And supposing that the distance pick-up 6 delivers one pulse per meter travelled and that the basic rate per kilometer is FF. 4, i.e. 0.4 centime per meter.

The conjunction speed at which the costs of distance travelled and of hired time are balanced is 9 Km/hr.

When a taxi travels in town, its speed is often approaching the conjunction speed and in this case it is very important in order to obtain the exact price, to make the right decision.

When the taxi travels at 9 Km/hr, it covers 2.5 m/sec. and the distance pick-up then delivers 2.5 pulses per second.

It is immediately obvious that the known devices which compare the frequency of the clock and of the distance pick-up could not operate in this instance, which nevertheless corresponds to an electronic clock and to a distance pick-up of a conventional type.

It is eqally obvious that the selection devices which split the taxi run into portions of run of equal duration, for example portions of about one second, and which periodically compare the number of pulses delivered by the distance pick-up with the number of pulses which it would deliver in one second at the conjunction speed, i.e. 2.5, will work very inaccurately.

The selection devices according to the invention eliminate these drawbacks by using a method which consists in splitting the taxi run into successive portions of run of equal length but of unequal duration, and more particularly into portions of run which correspond to the distance travelled by the taxi between two pulses, successive or not, of the distance counter. In the numerical example considered, the run is split into portions 1 meter long.

The clock pulses are counted through each portion and they are compared to a reference value, which is equal to the number of pulses which would be delivered by the clock if the taxi was travelling at the conjunction speed.

In the numerical example considered, at the conjunction speed of 9 Km/hr, the taxi travels 2.5 m/sec. and throughout the period taken to travel one portion of 1 meter, the clock delivers 400 pulses. It is immediately obvious that around the conjunction speed, the comparison will be concerned with a number approaching 400 and that an error of one or two pulses will entail a very small relative error, undoubtedly less than 1%.

If the comparison reveals, during the travelling of one portion, a number of clock pulses greater than the reference value, the taxi travels at a speed which is lower than the conjunction speed and this portion is counted at the hourly rate. In the opposite case, it is counted at the rate per kilometer. In both cases, the price of the portion just covered is added up to the price already recorded and the total price is recorded in a totalizing counter which is connected to a luminous display unit via known circuits.

Figure 2:
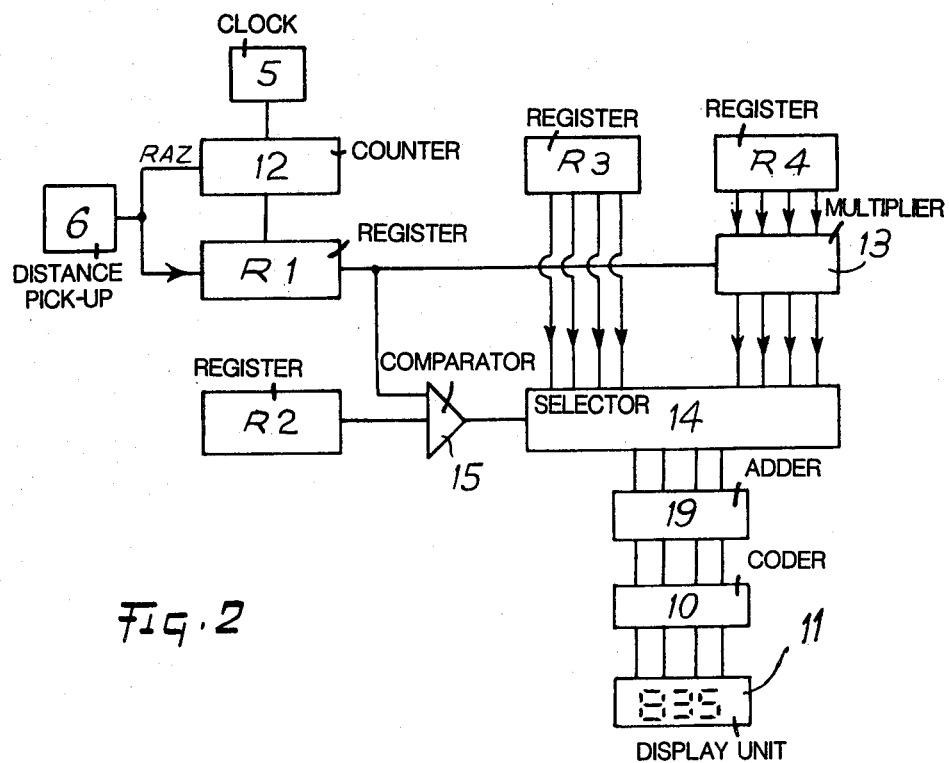
FIG. 2 is a diagram of the logic unit which splits the taxi run into successive portions of run and which selects the price of each elementary portion.

FIG. 2 shows an embodiment in discrete components (non-integrated) of a device according to the invention for splitting a taxi run into portions of run and working out the price of each such portion. An example of embodiment in discrete components has been chosen for clarity's sake. It is obvious that the discrete components can be incorporated in calculating units or in storage units as integrated circuits, for example in the units 1 to 3 of FIG. 1.

Said FIG. 2 also shows a clock 5 and means 6 for picking up the distance travelled by the taxi. The clock 5 is connected on a binary pulse counter 12 whose binary outputs are connected on a register R1. The output of the pick-up 6 is connected in parallel on the register R1 and on the resetting of the counter 12. Each time the said pick-up 6 delivers a pulse, said pulse controls the transfer and the storage into the register R1 of the number n1 of pulses counted by the counter 12 and the resetting of the counter 12 which immediately starts a new counting up of the clock pulses. Thus, for each pulse delivered by the pick-up 6, a binary number n1 is transferred into the register R1 which number n1 is equal to the number of clock pulses delivered between two distance pulses, successive or not, i.e. a number of clock pulses which measures the variable time period taken by the taxi to travel one portion of run of constant length.

The device comprises a second register R2 in which is recorded, in binary, a reference value equal to the number n2 of pulses which would be delivered by the clock, through the period taken to cover one portion travelled at the conjunction speed, for example a number equal to 400 in the numerical example considered.

The reference R3 represents a third register in which is recorded in binary, a number p2 equal to the price of the distance unit travelled by the taxi between two distance pulses, successive or not. In the numerical example considered, the distance travelled between two distance pulses is 1 meter and the unit price recorded in the register R3 is equal to 0.4 centime.

The reference R4 represents a fourth register in which is recorded in binary a figure equal to the price p1 of the time period elapsing between two successive clock pulses. In the numerical example considered, the figure 0.001 centime is recorded, in R4, which is the price of a millisecond of hiring of the taxi.

The registers R1, R2, R3 and R4 are for example sections of RAM memories in integrated circuits.

The reference 13 represents a binary multiplier circuit which is connected, on the one hand, on the output of the register R1 and on the other hand, on the register R4 and which works out the product of the number n1, recorded in the register R1, by the unit price p1, recorded in the register R4. The product n1.p1 represents the cost of the travel time for one portion whereas the price p2 is the cost of the constant distance covered for each portion.

It will be noted that p2=n2.p1 by definition of the conjunction speed.

The binary output of the register R3 and of the multiplier 13 are connected on demultiplexer circuit 14 which is a selector circuit of a known type so-called two-towards-one, which enables to route towards outputs, one or the other of two binary pieces of information fed into the circuit. The routing is controlled by a logic signal delivered by a comparator 15 which compares the numbers n1 and n2 recorded in the registers R1 and R2. If n1 is greater than n2, the logic signal delivered by the comparator 15 routes towards the output of the selector 14, the product n1.p1 delivered by the multiplier 13. If on the contrary, n1 is less than n2, the logic signal delivered by the comparator 15 routes towards the output of the selector 14 the price p2 recorded in the register R3. The output of the selector 14 is connected on a totalizing counter 19 in which the number delivered by the selector 14 is added to the previously recorded number. The binary outputs of the totalizing counter 19 are connected via known circuits 10 on a luminous display unit 11 on which is displayed the fare. Of course, after each comparison, the register R1 is reset until the next distance pulse.

As shown in FIG. 2, the device splits the taxi run into successive portions of run and selects the price rate to be applied for each portion, these operations being controlled by the pulses delivered by the pick-up 6. When the taxi is hired but stationary, the pick-up 6 issues no pulses and therefore it is necessary to add to the device wich has just been described an additional circuit permitting to count up the hiring time of the taxi as soon as the taxi moving speed becomes clearly less than the conjunction speed.

FIG. 3 shows a variant embodiment of a device which uses the method according to the invention whereby the taxi run is split into successive portions of equal length and which enables to do away with the addition of an extra circuit, in the case where the taxi is hired but stationary.

The reference 5 represents the electronic clock and the reference 6 the distance pick-up. The reference R3 and R4 represent, as in FIG. 2, registers in which are recorded respectively the price p2 of the distance unit corresponding to the constant length of each portion of run and the price p1 of the time unit which elapses between two successive clock pulses.

The output of the pick-up 6 and the register R3 are connected on an adder circuit 16 and every time the pick-up 6 delivers a pulse, the content of the adder circuit 16 goes up by an amount which is equal to the price p2 recorded in the register R3.

Likewise, the clock 5 and the register R4 are connected on an adder circuit 17, and every time the clock delivers a pulse, the content of the adder circuit 17 goes up by an amount which is equal to the price p1 recorded in R4.

The device comprises a logic circuit of selection and routing 18, which plays the same part as the circuits 14 and 15 of FIG. 2 and which is composed, on the one hand, by a comparator for comparing the numbers recorded in the totalizing counter 16 and 17 and on the other hand, by a demultiplexer of the two-towards-one type. The circuit 18 is connected, on the one hand, on the outputs of the adder circuits 16 and 17 and, on the other hand, on the output of the pick-up 6, every time the pick-up 6 delivers a new pulse, said pulse controls the comparator included in the circuit 18, which comparator compares the numbers recorded in the adder circuits 16 and 17 and routes the higher of these two numbers towards the output of the circuit.

The output of the circuit 18 is reconnected in parallel on the two adder circuits 16 and 17 and the selected value is recorded up in the two adder circuits in the place of the value precedingly recorded therein. The same price P is therefore recorded in the two adder circuits 16 and 17 at the start of each portion and, at the end of each portion, the circuit 18 compares thus a price P+p2 recorded in the adder circuit 16 with a price P+n1.p1 recorded in the adder circuit 17, n1 being the number of pulses delivered by the clock 5 during the portion of run. It is therefore clear that the comparison is made solely between, on the one hand, p2 and, on the other hand, n1.p1 since the same term P is found on both sides.

At the end of each elementary portion of run, two partial prices of the said portion are compared, one of them p2 corresponding to the length of the portion and the other, n1.p1 corresponding to the time spent to travel the portions, and the highest of these two partial prices is selected and recorded in the two adder circuits 16 and 17.

If for example the taxi has travelled one portion at a speed less than the conjunction speed, n1.p1 is greater than p2 and therefore the same value P+n1.p1 is recorded in the two adder circuits 16 and 17 at the end of a portion, which value will represent the total fare at the end of the portion.

The adder circuit 17 is used as a totalizing counter and is connected via known circuits 10 on a luminous display unit 11 where the total fare is displayed according to the official regulations in application.

If the taxi is stationary, the price recorded in the adder circuit 17 continues to increase automatically by amounts equal to the price of a waiting time unit, every time the clock 5 delivers a pulse.

When the run comes to an end and the fare is to be paid, the price counting stops instantly, to the millisecond, this eliminating all causes for errors in the fare.

FIG. 4 shows an embodiment of the circuits of FIG. 3. Said figure shows the same registers R3 and R4, the pick-up 6 which can be connected on a programmable frequency divider 6a, and the clock 5.

The circuits 16 and 17 of FIG. 3 each comprise three circuits 16a, 16b, 16c and 17a, 17b, 17c.

The circuits 16a, 17a are adder circuits.

The circuits 16b, 17b are registers or memories.

The circuits 16c, 17c are demultiplexer of the two-towards-one type.

The output of the register 16b is reconnected on an input of the adder circuit 16a, and the output of the register 17b is likewise reconnected on an input of the adder circuit 17a.

The adder circuit 16a adds up continuously the price p2 recorded in the register R3 with the number recorded in the register 16b. The added circit 17a does the same.

The circuit 18 of FIG. 3 is composed of a comparator 18a and of a demultiplexer 18b of the two-towards-one type. The binary output of the register 16b is connected in parallel on an input of the comparator 18a and on an input of the demultiplexer 18b. Likewise, the binary output of the register 17b is connected in parallel on the second input of the comparator 18a and on the second input of the demultiplexer 18b. The output of the demultiplexer 18b is reconnected in parallel on an input of each of the two demultiplexers 16c and 17c.

The output of the frequency divider 6a is connected on an input of an OR gate 20 and on a time-delay circuit 21, for example a monostable, whose output is connected in parallel on the second input of the OR gate 20, on the routing control of the demultiplexers 16c and 17c and on one input of an OR gate 22, on a second input of which is also connected the clock 5. The output of the OR gate 20 is connected on the loading validation terminal of the register 16b and the output of the OR gate 22 is connected on the loading validation terminal of the register 16b and the output of the OR gate 22 is connected on the loading validation terminal of the register 17b.

The functioning is now explained.

In the absence of pulses from the frequency divider 6a, the routing circuit of the demultiplexer 17c selects the output of the adder circuit 17a. Every time the clock 5 delivers a pulse, said pulse controls the transfer into the register 17b of the content of the adder circuit 17a which is equal to the immediately preceding content of the register 17b increased by one amount p1 contained in the register R4.

When the frequency divider 6a delivers a pulse, said pulse acts immediately on the loading control of the register 16b and as the demultiplexer 16c is also in the position where it selects the information coming from the adder circuit 16a, the register 16b receives the content of the adder which is equal to the immediately preceding content of the register 16a increased by an amount equal to the unit price p2 recorded in the register Permanently, the comparator 18a compares the two numbers recorded in the registers 16b and 17b and controls the demultiplexer 18b so that the latter routes in parallel towards the second inputs of the demultiplexers 16c and 17c, the highest number of the two.

After a slight delay due to the circuit 21, the latter delivers a second pulse which reaches the routing control of the demultiplexers 16c and 17c switching them towards selecting the information released by the output of 18b. At the same time, the delayed pulse crosses the gates 20 and 22 and controls the simultaneous transfer in the two registers 16b and 17b of the highest number of the two precedingly recorded in the two registers 16b and 17b.

Despite the structural differences, the device according to the FIGS. 2, 3 and 4 utilize the same method.

Indeed the device according to FIG. 2 compares two numbers n1 and n2 and selects a partial price which is equal, either to p2 if $n2 < n1$, or to $n1.p1$ if $n1 > n2$. Now, $p2 = n2.p1$ by definition of the conjunction speed which is that where the partial prices of an elementary portion of run are equal.

The comparison which is made between n1 and n2 is the same if the two terms are multiplied by the same number p1 and it therefore comes back to comparing $n1.p1$ to $n2.p1$ which is equal to p2, i.e. to comparing the partial prices of each elementary portion and to selecting the highest of the two.

The device according to FIG. 3 effects the selection by comparing two numbers respectively equal to $P + p2$ and to $P + n1.p1$ and therefore compares also a partial price $n1.p1$ which is based on the duration of the portion at a special price p2 which is based on the constant length of each portion.

It is therefore obvious that the two devices start from the same method which permits to simlify the circuits, and consist in splitting each taxi run into elementary portions of equal length, which portions can be very short, about 1 meter or even less, so that the instantaneous speed of the taxi cannot substantially depart from the average speed during one portion, and then in comparing the partial prices of each portion, i.e. a partial price p2 based on the distance travelled which is the same for each portion since they all have the same length and a partial price $n1.p1$ which is proportional to the duration n1 of each portion.

In the examples illustrated in FIGS. 2 and 3, the distance pick-up is connected directly on the counter 12 or on the adder circuit 16 and the taxi run is split into portions whose length is constant and corresponds to the distance travelled by the taxi between two successive pulses. It is specified that a programmable frequency divider 6a can be inserted between the pick-up 6 and the circuits 12 and R1 or 16 and 18, so that the taxi run is split into portions whose constant length is equal to the distance travelled by the taxi between two successive pulses delivered by the frequency divider, i.e. between two pulses of the distance pick-up which pulses are separated by a constant number of pulses which can be caused to vary according to the rates applied.

The decoding circuit 10 forming part of the display unit 11 receives continuously at its inputs, the amount of the fare expressed in logic signals.

Said logic signals can be binary signals or else they can be converted into decimal code using a well known converter (B C D converter).

The decoder 10 is a well-known circuit which permits to light up either luminous modules with seven segments or any other display means composed of luminous modules or liquid crystals.

According to certain official regulations, the displayed price should not vary continuously but only by jumps of constant value. In this case, the apparatus according to the invention can easily be adapted by associating it to known logic circuits or by the partial use of a microprocessor.

What is claimed is:

1. Method for calculating a taxi fare displayed on an electronic taximeter, according to which the distance travelled by the taxi is measured by means of a distance pick-up, which delivers a number of pulses proportional to said distance, and the duration of the taxi run is measured by means of an electronic clock which delivers pulses of constant and high frequency, wherein the taxi run is split into elementary portions of equal length, which is the constant distance travelled by the taxi between two successive pulses delivered by the distance pick-up; the number of pulses n1 delivered by the said clock during each elementary portion, i.e. between two successive pulses of the distance pick-up is counted; a constant number p2 which is the unit price of a travelled distance equal to the constant length of each portion, is compared after each portion, to a variable number n1.p1 which is the partial price of the portion obtained by multiplying the price p1 of a time unit equal to the period of the said clock, by the duration n1 of each portion; the highest of the two numbers then selected as partial price of the said elementry portion; and wherein the total fare is calculated by adding up the said partial prices.

2. The method of claim 1, wherein a constant number n2 equal to the number of pulses delivered by the said clock during the period needed to travel one portion at the conjunction speed, is recorded in a register; wherein the variable number of pulses n1 is compared, after each elementary portion, to the number n2; and wherein, depending on whether n1 is greater or smaller than n2, either the price n1.p1 or the price p2 is selected.

3. The method of claim 1, wherein on a first adder circuit are connected, on the one hand, a register R3 in which is recorded the unit price p2 and on the other hand, the said pick-up and the content of the said adder circuit is increased by an amount equal to p2 every time the pick-up delivers a pulse; wherein on a second adder circuit are connected, on the one hand, a register R4 in which is recorded the unit price p1 and, on the other hand, the said clock, and the content of the said second adder circuit is increased by an amount equal to p1 every time the clock delivers a pulse; wherein the outputs of the said adder circuits are connected on a selective routine circuit which comprises a comparator comparing the numbers recorded in the two counters and a demultiplexer routing towards the output the highest of the two numbers; and wherein the output of the said routing circuit is reconnected in parallel on the said adder circuits, so that after each pulse delivered by the said pick-up, the greater of the two numbers recorded in the two adder circuits comes to be recorded in the two adder circuits and the output of the circuit adding the clock pulses is connected on a luminous display unit.

4. Electronic taximeter of the type comprising a distance pick-up which delivers a number of pulses proportional to the distance travelled by the taxi, an electronic clock, means for splitting each taxi run into successive elementary portions and for calculating the partial price of each portion, a totalizing counter for the said partial prices and a luminous display unit which displays the price recorded in the said totalizing counter, wherein said taximeter comprises: a register R3 in which is recorded a constant number equal to the unit price p2 of a distance equal to the constant distance travelled by the taxi between two pulses issued by the said distance pick-up; a register R4 in which is recorded a number equal to the unit price p1 of a hiring duration equal to the said clock period; a pulse counter which counts up the number of pulses n1 delivered by the said clock between two pulses delivered by the said pick-up; and logical circuits which compare after each pulse delivered by the said pick-up, the number p2 to the product n1.p1 and which selects as partial price of the said portion the highest of the two numbers.

5. The electronic taximeter of claim 4, wherein said taximeter comprises: a register R1 which is connected on the output of the said pulse counter; a second register R2 in which is recorded a constant number n2 equal to the number of pulses delivered by the said clock during the interval between two pulses delivered by the said pick-up when the taxi travels at the conjunction speed; a multiplier circuit on which are connected the register R4 and the register R1 and which calculates the product n1.p1; a comparator which compares the numbers n1 and n2 recorded in the registers R1 and R2; a demultiplexer circuit with two inputs, connected respectively on the register R3 and on the multiplier circuit, which demultiplexer is controlled by the logic signal delivered by the said comparator, so that it transmit the product n1.p1 if n1 is greater than n2 and that it transmits the price p2 recorded in the register R3 if n1 is smaller then né and the output of the said demultiplexer is connected on a totalizing counter.

6. The electronic taximeter of claim 4, wherein said taximeter comprises: a first adder circuit on which are connected the said distance pick-up and the said register R3, which first adder circuit is of the type whose content is increased by an amount equal to p2 every time it receives a pulse from the pick-up; a second adder circuit on which are connected the said clock and the said register R4, the said second adder being of the type whose content is increased by an amount equal to p1 every time it receives a clock pulse; a selector logic circuit comprising two inputs connected on the outputs of the two adder circuits and a control terminal connected on the output of the dictance pick-up, which selector circuit is of the type which compares the numbers recorded in the adder circuits every time it receives a pulse from the pick-up and which lets through the greatest of the two numbers and the output of the selector circuit is reconnected in parallel on the two adder circuits so that after each pulse delivered by the pick-up, there is in the two adders the same number equal to the number P which was there after the preceding pulse, increased by the greatest of the two numbers p2 and n1.p1 recorded respectively in the two adder circuits between two successive pulses of the pick-up, the number n1 being the number of clock pulses delivered between two successive pulses of the distance pick-up and one of the adder circuit is used as a price totalizing counter and is connected on the luminous display unit of the taximeter.

* * * * *

UNITED STATES PATENT AND TRADEMARK OFFICE
CERTIFICATE OF CORRECTION

PATENT NO. : 4,409,685

DATED : October 11, 1983

INVENTOR(S) : Claude F. Ricard

It is certified that error appears in the above-identified patent and that said Letters Patent is hereby corrected as shown below:

Column 2, line 9, "taxis" should read -- taxi --;

Column 2, line 16, "wen" should read -- when --;

Column 7, line 36, "of" should read -- or --;

Column 9, line 55, "wich" should read -- which --;

Column 10, line 47, "portions" should read -- portion --;

Column 11, line 57, after "ter" insert -- R3. --;

Column 12, line 26, "simlify" should read -- simplify --;

Column 13, line 20, after "numbers" insert -- being --;

Column 14, line 9, "logical" should read -- logic --;

Column 14, line 28, "transmit" should read -- transmits --;

Column 14, line 30, "then" should read -- than --;

Column 14, line 31, "né" should read -- n2 --;

Column 14, line 45, "dictance" should read -- distance --; and

UNITED STATES PATENT AND TRADEMARK OFFICE
CERTIFICATE OF CORRECTION

PATENT NO. : 4,409,685

DATED : October 11, 1983

INVENTOR(S) : Claude F. Ricard

It is certified that error appears in the above-identified patent and that said Letters Patent is hereby corrected as shown below:

Column 14, line 59, "circuit" should read -- circuits --.

Signed and Sealed this

Fourteenth Day of February 1984

[SEAL]

Attest:

GERALD J. MOSSINGHOFF

Attesting Officer

Commissioner of Patents and Trademarks